United States Patent [19]
Moser et al.

[11] B 3,988,707

[45] Oct. 26, 1976

[54] SWING OUT LOAD COIL ASSEMBLY

[75] Inventors: Jesse Lee Moser, Highpoint; Robert Philmore Reavis, Statesville; Melvin Andrew Soderstrom, Advance, all of N.C.

[73] Assignee: AMP Incorporated, Harrisburg, Pa.

[22] Filed: Nov. 14, 1974

[21] Appl. No.: 523,952

[44] Published under the second Trial Voluntary Protest Program on March 23, 1976 as document No. B 523,952.

[52] U.S. Cl. .................................... 336/65; 178/46; 336/68; 336/192; 336/208; 339/99 R
[51] Int. Cl.² ........................................... H01F 15/02
[58] Field of Search ............ 339/99 R, 97 R, 256 R; 178/46; 336/192, 65, 68, 196, 208, 180

[56] References Cited
UNITED STATES PATENTS

| | | | |
|---|---|---|---|
| 2,079,697 | 5/1937 | Ranges | 336/192 X |
| 3,134,854 | 5/1964 | Martin, Jr. et al. | 336/68 X |
| 3,526,712 | 9/1970 | Drom | 336/208 X |
| 3,638,171 | 1/1972 | Huibrechtse | 339/256 R |
| 3,760,335 | 9/1973 | Roberts | 339/99 R |
| 3,824,530 | 7/1974 | Roberts et al. | 339/99 R |
| 3,845,435 | 10/1974 | Georgopulos | 178/46 X |
| 3,865,980 | 2/1975 | Moser et al. | 178/46 |
| T920,007 | 3/1974 | Cator | 336/208 X |

FOREIGN PATENTS OR APPLICATIONS 477,749   10/1969   Switzerland .......................... 178/46

Primary Examiner—Thomas J. Kozma
Attorney, Agent, or Firm—R. W. Pitts; F. W. Raring; Jay L. Seitchik

[57] ABSTRACT

A load coil assembly housing for use with multiconductor cable containing a plurality of associated pairs of electrical conductors has connector terminals located along the periphery of the region in which load coils are located. That makes the otherwise conventional housing suitable for use with mass application tooling. Cable wires and load coil or component leads may be respectively attached by solderless and solder techniques to one terminal.

8 Claims, 10 Drawing Figures

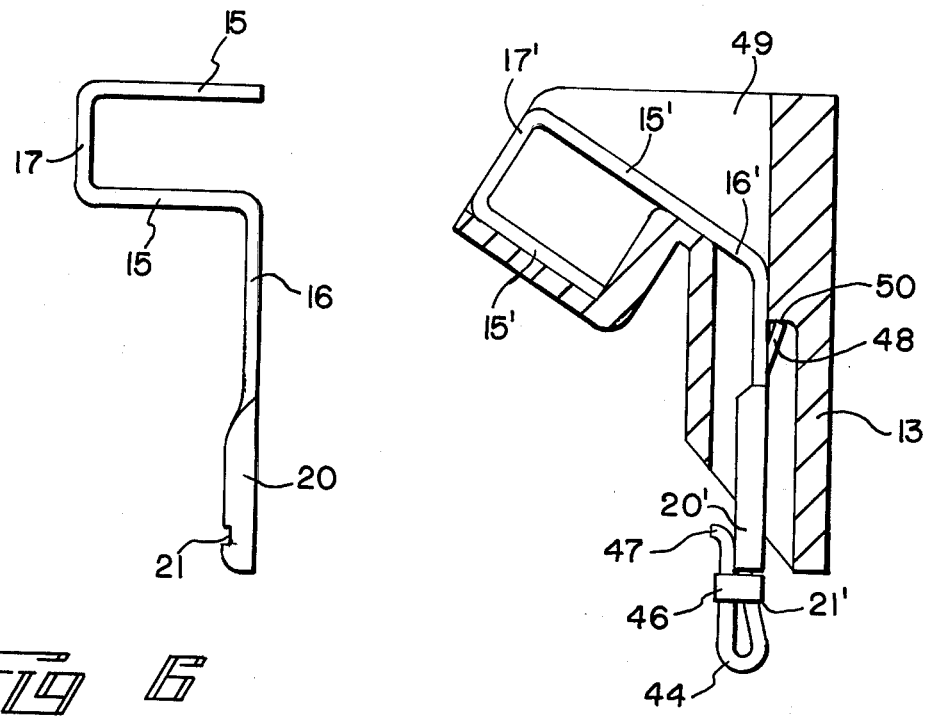
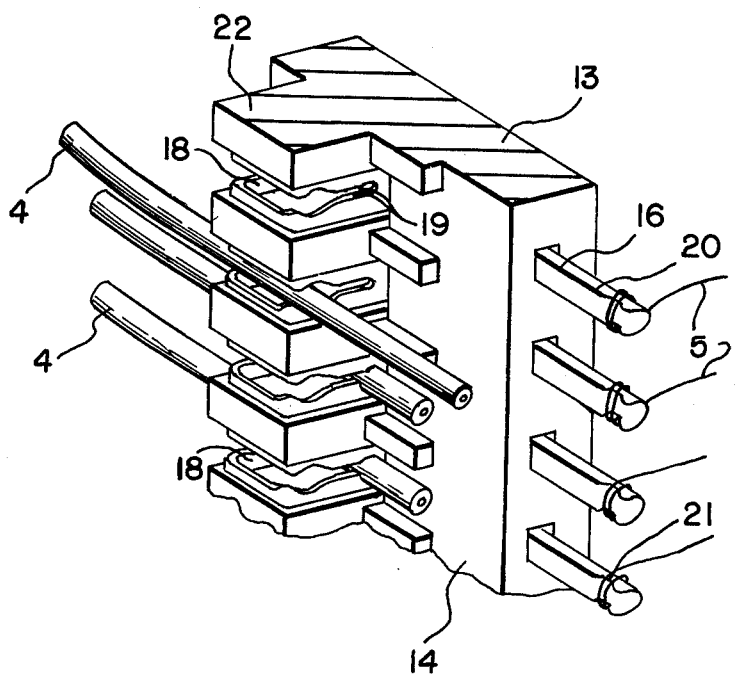

SWING OUT LOAD COIL ASSEMBLY

BACKGROUND OF THE INVENTION

1. Field of Invention

This invention relates to connections of a multitude of components at some point in a multi-conductor cable. One particular application of this invention involves a connection of individual inductance coils in series with each pair of a plurality of associated pairs of conductors in a multi-conductor cable. This invention is adapted for use with a standard array of coils and allows the coils to be densely packed around the multi-conductor cable element.

By using the invention disclosed and claimed in this application, greater rates of assembly may be attained. Both coil lead wires and cable conductors are attached to connectors mounted on the outside of the assembly. Cable conductors can be attached to connector terminals mounted along the periphery of the assembly by suitable mass application techniques. Coil wire leads may be attached and then soldered to the same terminals. Suitable connector terminals providing solderless and soldered connecting means are also disclosed and claimed.

2. Description of the Prior Art

The use of load coils is one application where large numbers of electrical components must be connected to a multiconductor cable in as small a space as possible. Load coil assemblies in which individual load coils are attached to the individual conductors in multi-conductor telephone cable are located at approximately one mile intervals. Inductors must be provided in order to balance the effect of built up capacitance which develops between separate conductors.

Martin et al., U.S. Pat. No. 3,134,854 and Drom, U.S. Pat. No. 3,526,712, both disclose load coil assemblies for use with multi-conductor cable. The unit disclosed in Martin contains a number of individual coils located on each of several parallel mounting boards in planes perpendicular to the axis of the cable. Terminals for connecting cable conductors to coil wires are located on plates mounted on top of each separate coil. Access to the terminals is therefore somewhat hindered in a multi-layer configuration. Drom discloses a loading coil assembly in which the central openings of the coils are perpendicular to the axis of the cable. The terminals are again located on plates mounted on each separate coil. In this configuration, the terminals are readily accessible since they are all located on the outside of the assembly. A greater longitudinal length of cable is required for a given number of coils, however.

U.S. Pat. No. 3,865,980 discloses and claims a loading coil assembly containing a plurality of spaced-apart trays positioned on the cable and coil housings mounted between the trays. Each coil housing contains a plurality of loading coils. Terminals are located on the coil housing so that cable conductors can be inserted into a slot on the terminals. The slots are located on the outer side of the assembly for easy access. This configuration, while advantageous in many respects, does not provide for more than one coil in the radial direction at any given point. For assemblies in which a large number of coils are required, more than one radial layer of coils may be needed and this configuration would be unacceptable.

At present, where a large number of coils are needed, the dense spacing required is achieved by placing the individual coils in swing out trays which allow a two-deep radial spacing of the load coils. In a prior art configuration, connector terminals for the cable wires and the coil wire leads are located on top of each coil. With such dispersed spacing, mass application techniques cannot be efficiently employed. The instant invention involves the positioning of the connector terminals on the periphery of the assembly to provide access for mass application tooling.

BRIEF SUMMARY OF THE INVENTION

In order to achieve the returns possible with mass application techniques, connections between load coils and associated pairs of conductors in multi-conductor cable must be altered. Solderless connection provides speed by enabling the use of mass application tooling. This invention involves the use of essentially conventional swing out trays with means for feeding cable conductors and coil wire leads to a connector terminal housing located on the outside of the load coil assembly. The connector housing contains terminals with aligned solderless connecting means for cable conductors and aligned solder connecting means for coil lead wires.

Objectives of this invention include the achievement of mass application of cable wires to terminals in a load coil assembly. Another object is to allow use of a standard coil housing configuration to achieve the required load coil density while at the same time provide for use of mass-application techniques. One other object is to provide a terminal with one solder and one solderless connecting means so that cable conductors and coil load wires may be attached to the same terminal.

These and other objects of the invention are achieved in a preferred embodiment thereof which is briefly described in the foregoing abstract, which is described in detail below and which is shown in the accompanying drawing in which:

FIG. 6 is a side view of a standard terminal.

FIG. 7 is an isometric view showing the slot for receiving the cable wires and showing the terminals mounted in a housing.

FIG. 8 is a side view of an alternative embodiment of the terminal located in a suitable housing.

DETAILED DESCRIPTION

Figure 2:
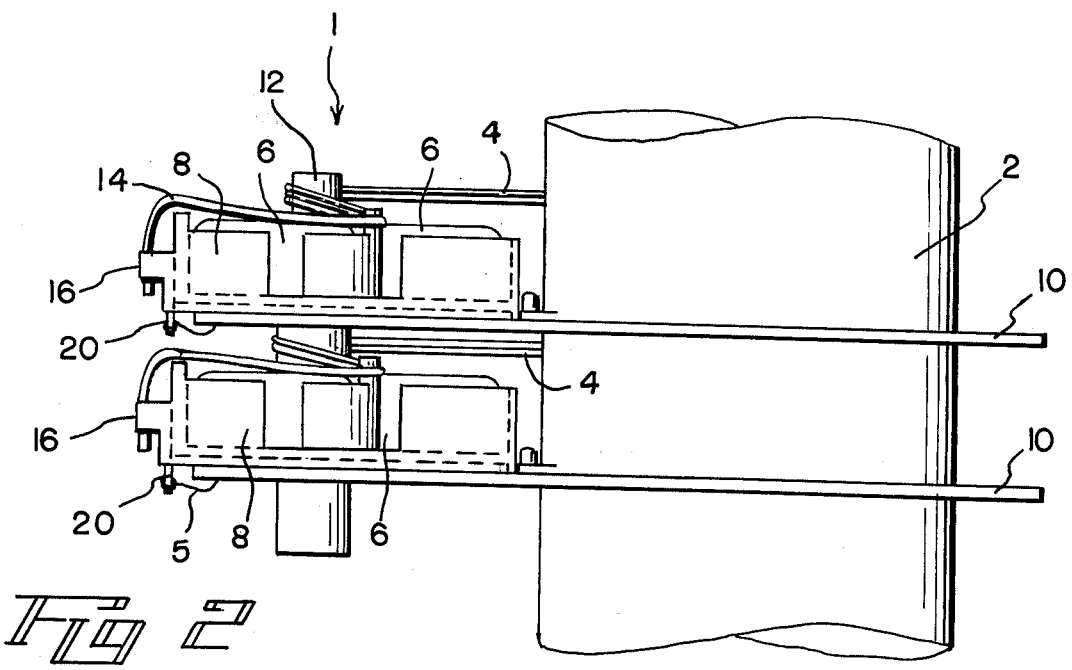
FIG. 2 is a side view showing two layers of load coil trays.
Figure 5:
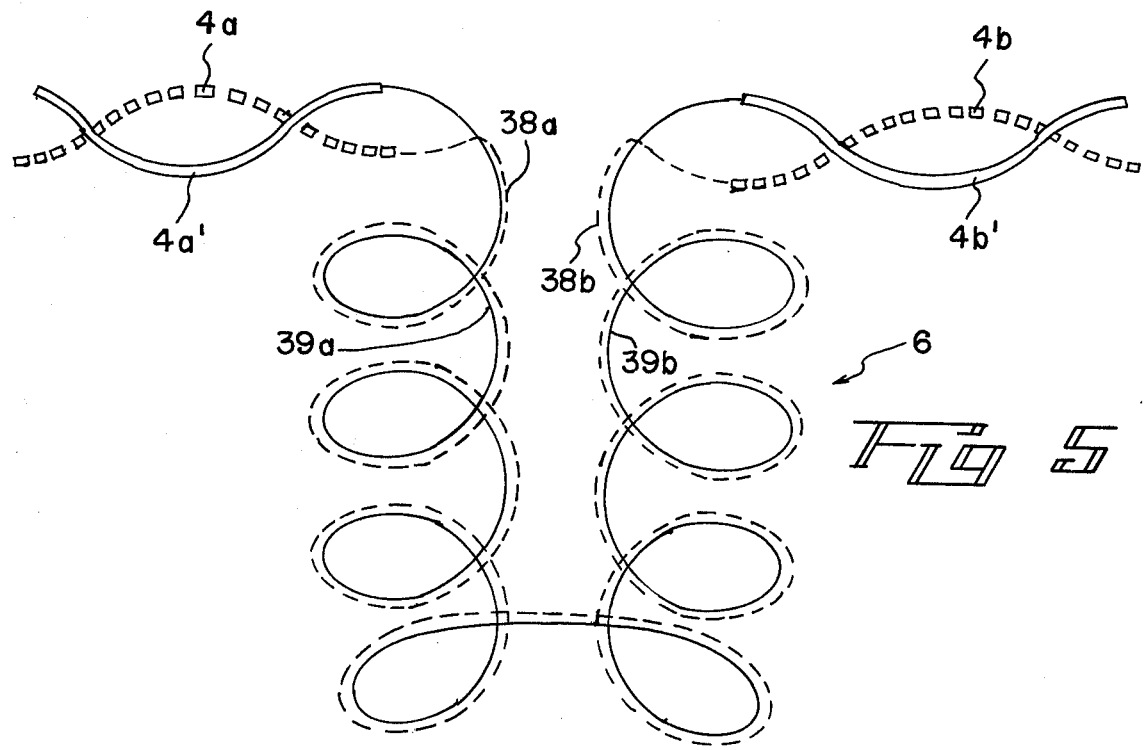
FIG. 5 is a schematic representation of the manner of connecting the conductors in the cable to the conductors in the coil.

Referring first to FIG. 5, it is sometimes desirable to connect the conductors of a twisted pair of conductors 4 in a telephone cable to a toroidal coil of the type shown at 6 in FIG. 2. Each coil comprises two windings indicated at 38 and 39 in FIG. 5 which are wound in the form of a single toroid so that the coil has four leads indicated at 38a, 39a, 38b, 39b. The coil is connected to the twisted pair 4 of conductors by connecting the conductor 4a to the lead 38a, connecting the conductor 4a to the lead 39a, connecting the conductor 4b to the lead 38b, and connecting the conductor 4b' to the lead 39b.

Figure 1:
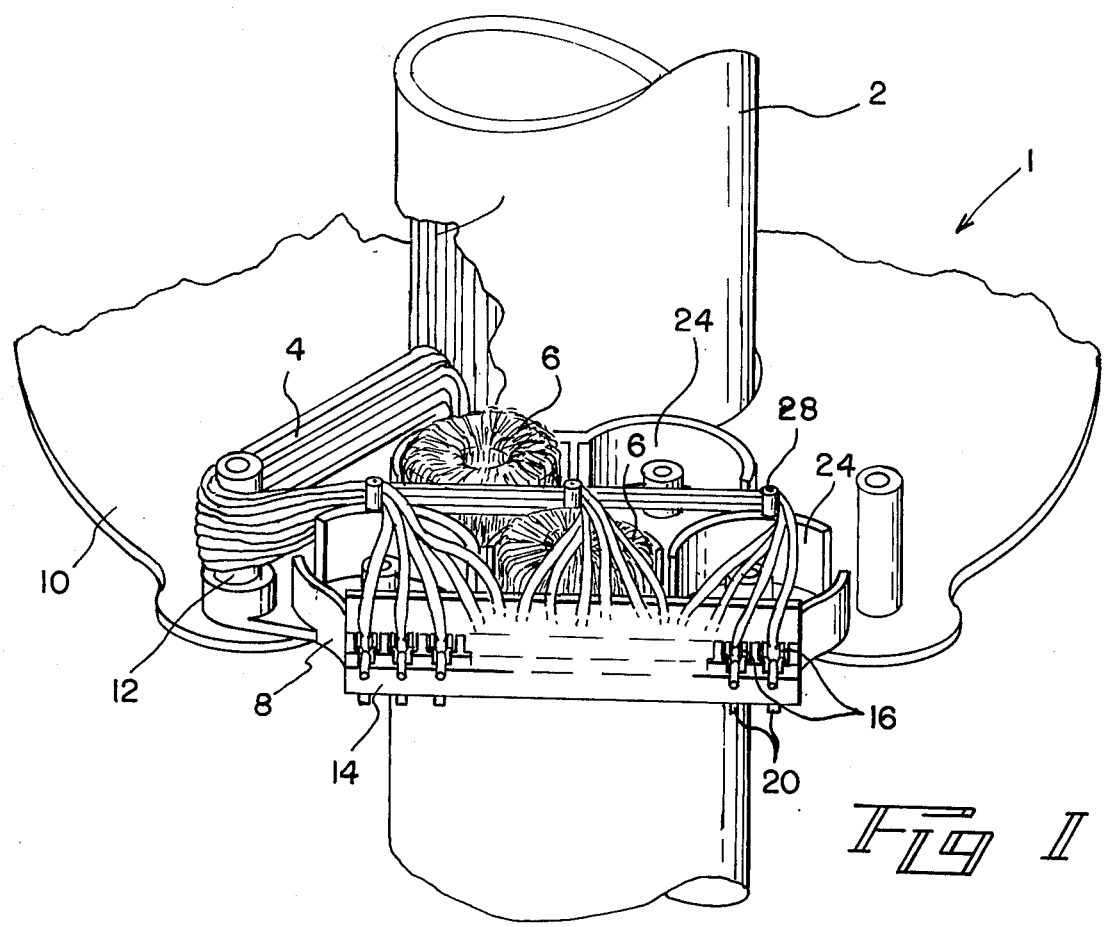
FIG. 1 is an isometric view of a single compartment containing five load coil cells and showing cable wires extending to connector terminals.

Two of the coils shown diagramatically in FIG. 5 are shown positioned in coil cells 24 in swing out trays or compartments 8 in FIG. 1. Swing out compartment 8 is mounted on board 10. Board 10 lies in a plane which is transverse to the axis of multi-conductor cable element 2. The multi-conductor cable element 2 extends through the center of the mounting board 10. Cable conductors or wires 4 are shown extending from the cable element 2 to terminals 16 mounted on the outer surface 14 of swing out compartment 8. A bundle of conductors 4 is shown extending around pivot post 12 and then representative groups of conductors fan out from guide posts 28 to appropriate terminals 16. The wires must first be wrapped around pivot post 12 so that compartment 8 can swing outwardly in the manner described below.

The compartments 8 shown here contain five coil cells 24 located in two radial layers. Coils are shown in only two of the five cells. The compartment 8 is not rigidly attached to board 10 but rather is mounted on pivot post 12. This allows for the tray to swing out for access to all of the coils. The tray would be rotated clockwise as shown in FIG. 3 and is normally held in position by the action of restraining pin 30 and restraining clip 32 shown in FIG. 3.

Terminals 16 are located side-by-side on the outer surface 14 of the swing out compartment 8. The terminals have a cable conductor receiving means 18 located adjacent to the top of the outer surface 14 and coil lead wire receiving means 20 located at the bottom of surface 14 and below the plane of the mounting board 10. In FIG. 1 the cable conductor receiving means 18 for all the terminals are located in a straight line. The same is true for the coil wire receiving means 20. Simultaneous attachment of the individual cable wires 4 to terminals 16 would clearly be facilitated by this alignment.

FIG. 2 is a side view showing two swing out compartments located one on top of the other. In actual practice there would be a number of such layers and there would be compartments 8 all around the cable 2 rather than just on one side as shown here.

Figure 3:
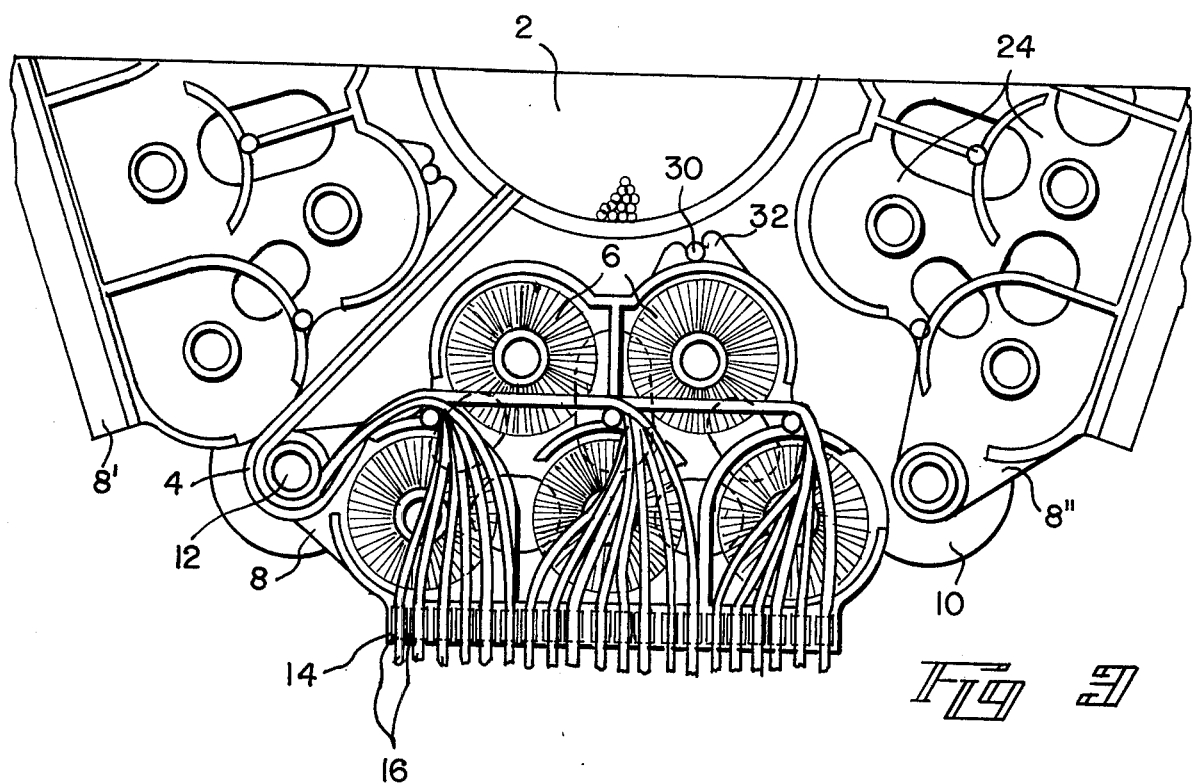
FIG. 3 is a top view of one-half of a layer of load coil compartments.

FIG. 3 is a view showing the top of a single layer of load coils. Portions of three compartments 8, 8', and 8'', are shown. Only half of one layer is shown in this figure. In a complete layer corresponding to this embodiment, five compartments 8 would be positioned in pentagonal surrounding relationship to cable 2. In FIG. 3 the lacing of cable conductors 4 around the pivot posts 12 and guides 28 to the terminals 16 is clearly shown. The compartment 8 shown here contains cells 24 for five coils. When used with 25 pair telephone cable, multiples of five would of course be convenient. Briefly referring to FIG. 5 it can be seen that four connections 4a to 38a and so forth, are required for each load coil. Twenty terminals are thus required for each compartment as shown in FIG. 3.

Figure 4:
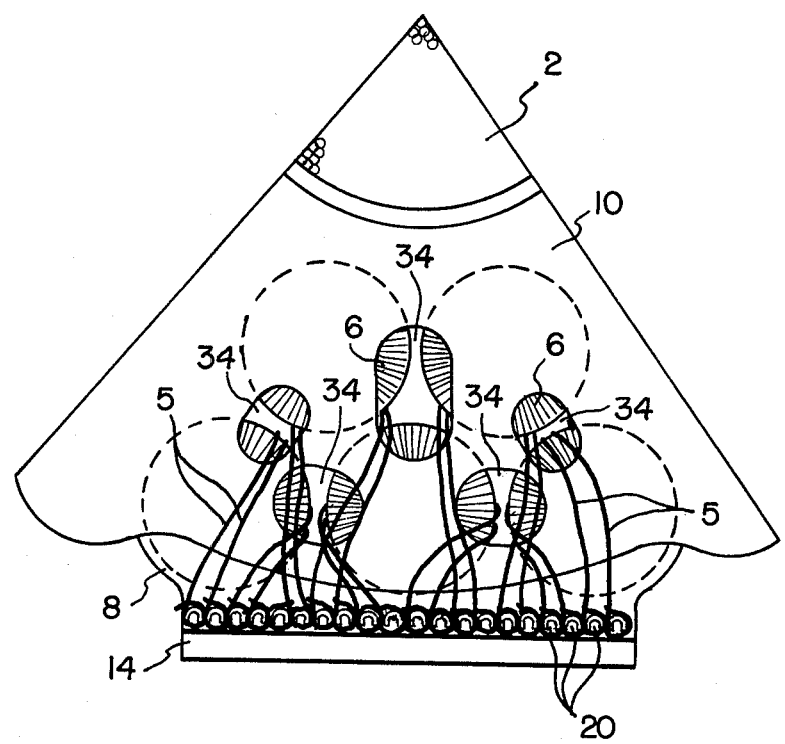
FIG. 4 is a bottom view of a portion of one of the layers showing the coil lead wires extending from the coils to the terminals.

As one method of lacing of twenty cable conductors 4 is shown in FIG. 3, a method in which twenty coil lead wires 5 can be attached to terminal posts 20 is shown in FIG. 4. FIG. 4 is a bottom view showing a pattern of coil wire openings 34 in mounting board 10. Each of the five openings shown in this pattern is positioned so that at least two coils are exposed. Each coil also overlays at least two openings. Four coil lead wires 5 from each coil can then be threaded through appropriate holes and attached to terminals 16 on the lower side of mounting board 10.

Figure 10:
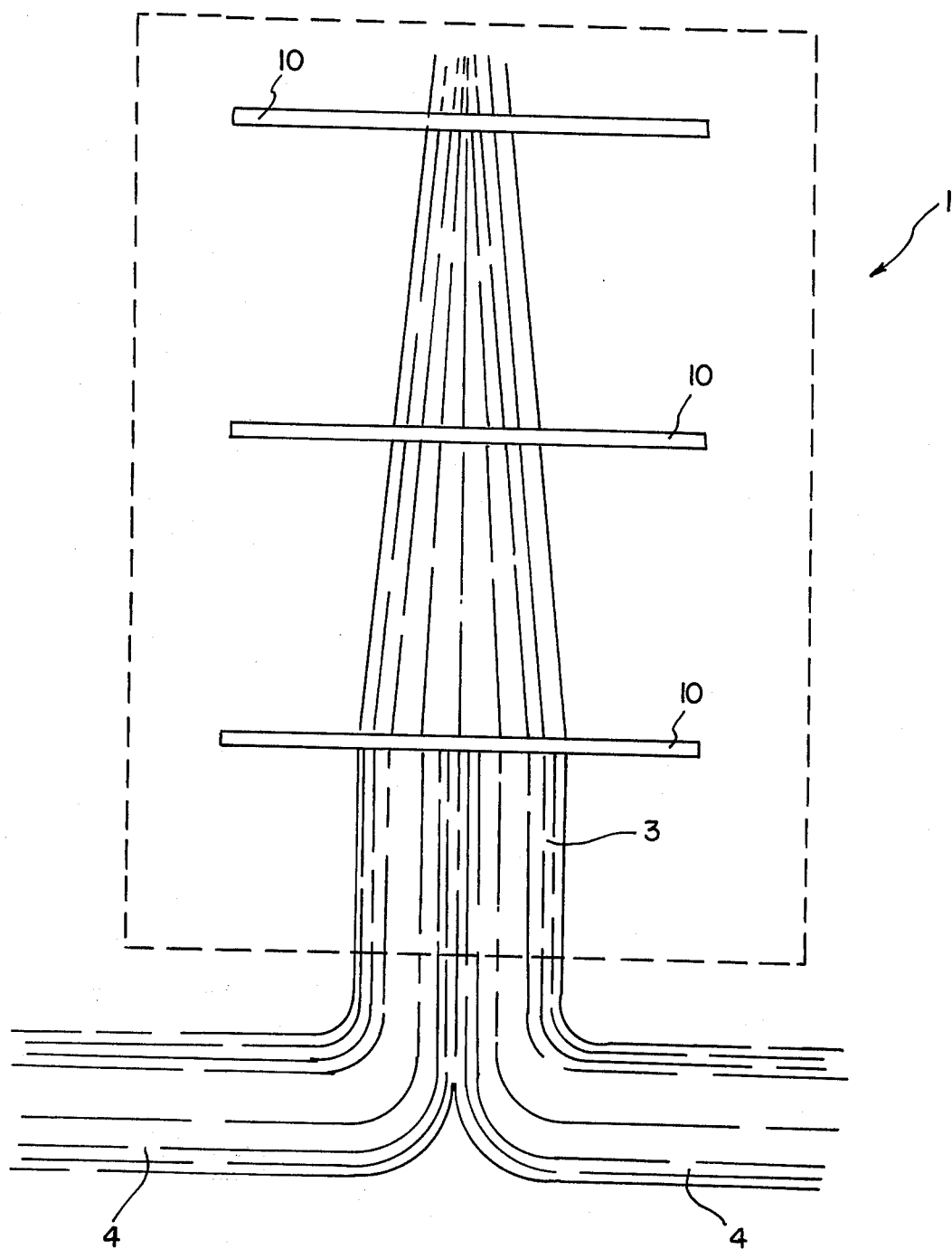
FIG. 10 is a diagramatic view of the manner in which the loading coil assembly is connected to a multi-conductor cable.

FIG. 10 illustrates the manner in which the cable conductors are arranged in this invention. In actual practice, the load coil assembly is manufactured in a factory, encased in a housing, and then installed on the cable at the work site. FIG. 10 does not show those details, but it does show that the lower portion 3 load coil assembly, represented by dotted line 1, contains twice as many conductors as the external cable 4. As the multi-conductor cable element in the load coil assembly passes each successive layer, represented by mounting boards 10, some of the cable conductors are connected to coils located on that layer. A decreasing number conductors extend into the interior of the assembly until the final conductors have been attached to coils located on the final mounting board 10.

Two embodiments of terminals which can be used with this invention are shown in FIGS. 6 and 8. Either terminal and surely other embodiments incorporating the same concept could be used to attain the mass insertion capabilities of this invention. FIG. 6 depicts the simpler of the two terminals. Several of these simpler terminals are shown in FIG. 7 as they would appear when mounted in a housing.

Terminal 16 of FIG. 6 has a cable conductor receiving portion 17 and coil wire posts 20. The coil wire posts are U-shaped for stiffness as can be seen in FIG. 7. A notch 21 is located on this U-shaped portion so that the coil leads 5 can be securely wrapped around the terminal. The cable conductor receiving means 17 is also substantially U-shaped containing two upright members 15 joined by a strap section. A slot 18 is formed in the members 15 and the adjoining strap section. This slot can be seen in FIG. 7 where cable wires 4 have been fully inserted into slots in two terminals while a third wire is in position to be moved laterally of its axis and into a slot. As shown by the two lower slots in FIG. 7, the slot edges 19 are spaced apart by a width which is less than the diameter of the insulated wires 4. The slot edges then penetrate the insulation and firmly establish electrical contact with the underlying conductive core. The presence of two upright members 15 provide a measure of strain relief as well as redundant electrical contact.

An alternative embodiment of the terminal is shown in FIG. 8. Terminal 16' has an inclined cable conductor receiving portion 18' and a modified coil lead wire attachment means 21'. Inclination of the U-shaped cable wire receiving portion 18' could aid in the wire-insertion operation. The attachment means 21' comprises a U-shaped spring 44, a wire stop 46 and a clip 47. The U-shaped spring 44 biases the clip 47 against the terminal post 20'. The top of clip 47 is a convex surface which serves as an entrance portion. A coil wire can be moved between clip 47 and post 20'. When the wire abuts the stop 46 it may be broken off leaving the coil wire secured between clip 47, stop 46, and post 20'. This operation replaces the wire wrap operation necessary with the more conventional embodiment of FIG. 6. In both cases, once the coil lead wire has been secured to the post 20 or 20', the connection can be completed by soldering the coil wire to the terminal.

FIG. 8 demonstrates one manner in which either terminal may be mounted in the terminal housing 13 adjacent to the terminal supporting surface 14. The terminal 16' has been inserted, coil wire post 20 first, into housing cavity 49. When the terminal has been completely inserted into the cavity 49, upright members 15' abut suitable cavity walls preventing further downward movement and terminal latch abuts an appropriate shoulder 50 preventing removal.

Figure 9:
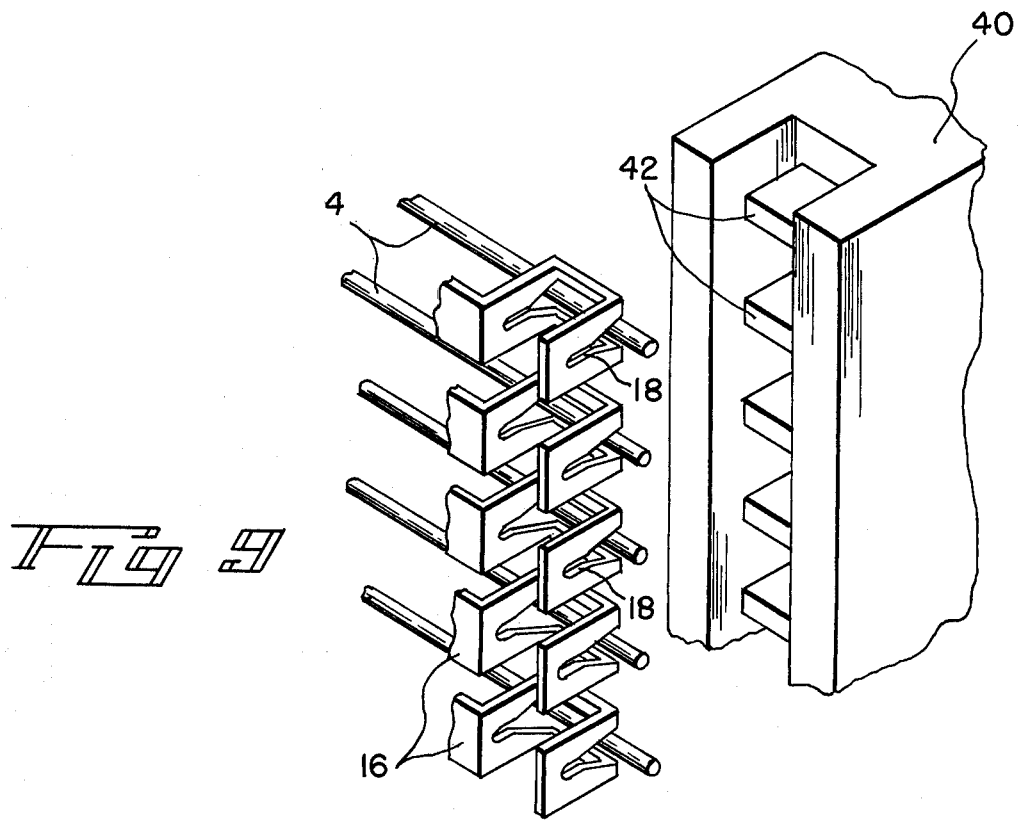
FIG. 9 is a view showing simplified mass insertion tooling.

FIG. 9 demonstrates a simplified version of the insertion technique that would be used with the preferred embodiment of this invention. Aligned slotted cable wire receiving portions 16 are shown with cable wires 4 positioned for insertion into slots 18. Tool head 40 has a plurality of punches 42 positioned in alignment with wires 4 and slots 18. As the tool head 40 is moved toward the terminals the punches 42 force the individual wires 4 into the slots 18. Electrical connection of numerous insulated multiconductor cable conductors can thus be accomplished in one operation. It should be remembered however that other mass insertion techniques could be employed without departing from the essence of the instant invention. Other modifications within the scope of the appended claims will be apparent to those skilled in the art. The foregoing description has therefore been presented for illustration purposes only and is not intended to limit the invention in any way. All reasonable modifications of the invention not specifically set forth are intended to be included within the scope of this invention.

What is claimed is:

1. In combination with a multi-conductor cable element comprising a plurality of pairs of associated conductors, an improved loading coil assembly for connecting a coil to each of said pairs, said assembly having a plate-like member extending transverse to the local axis of said cable with said cable extending through an opening in the center of said plate-like member, and a coil tray mounted on said plate-like member, said coil tray having a bottom surface with a number of holes therein with upstanding walls extending from said bottom surface to form a number of separate cells, each cell being laterally displaced from said cable element and containing a loading coil, the improvements comprising:

an upstanding surface located on the periphery of said tray, said surface having a top side and a bottom side, the latter being adjacent to the bottom surface of said coil tray, a plurality of side-by-side terminals located on said upstanding surface, each of said terminals having first and second spaced-apart wire receiving portions, adjacent to opposite ends thereof, all of said first wire receiving portions being identical and being located adjacent to the top side of said upstanding surface, and all of said second wire-receiving portions being identical and being located adjacent to the bottom side of said upstanding surface, a plurality of conductors extending outward from said multi-conductor cable element, across the top of said cells, and across the top side of said upstanding surface, each of said conductors being affixed to one of said first wire-receiving portions of said terminals, and coil wires extending from each of said coils through said holes in said bottom surface and across the bottom side of said upstanding surface, each of said conductors being affixed to one of said second wire receiving portions of said terminals at a point spaced from said coil, whereby all of the connections of said conductors and said coil wires to said terminals are accessible.

2. A combination as set forth in claim 1 wherein said tray is mounted on a pivot post located on said plate-like member and a number of additional upstanding guide posts are located on said upstanding walls and said plurality of conductors extends outwardly from said multi-conductor cable element and is partially wrapped around said pivot post and each of said conductors is partially wrapped around at least one of said additional upstanding guide posts and then across said top side of said upstanding wall so that said tray may be pivoted about said pivot posts without restriction by said conductors and said additional upstanding guide posts align said conductors with said first wire receiving portions.

3. A combination as set forth in claim 2 wherein said first wire receiving portions are of the type which establish electrical contact with an insulated conductor by simple movement of said conductor laterally of its axis and into said first wire receiving portion.

4. A combination as set forth in claim 3 wherein said coil wires are attached to said second wire receiving portions by means of solder.

5. A combination as set forth in claim 3 wherein said first wire receiving portion comprises a slot in said terminal, said slot being formed by substantially parallel edges on said terminals, said parallel edges being spaced apart by a distance which is less than the diameter of the conductive core of said conductor affixed to said first wire receiving portions.

6. A combination as set forth in claim 5 wherein said terminals are positioned on said upstanding surface so that all of said slots are parallel and each of said slots is transverse to the plane of said plate-like member.

7. A combination as set forth in claim 1 wherein a plurality of said trays are located on said plate like member and positioned around said cable.

8. A combination as set forth in claim 1 wherein said tray contains cells having different radial displacements from said multi-conductor cable element.

* * * * *